(12) United States Patent
Wimmer

(10) Patent No.: US 8,599,526 B2
(45) Date of Patent: Dec. 3, 2013

(54) PROTECTION LOCKOUT IN SUBSTATION AUTOMATION

(75) Inventor: Wolfgang Wimmer, Rietheim (CH)

(73) Assignee: ABB Technology AG, Zurich (CH)

( * ) Notice: Subject to any disclaimer, the term of this patent is extended or adjusted under 35 U.S.C. 154(b) by 2 days.

(21) Appl. No.: 13/323,153

(22) Filed: Dec. 12, 2011

(65) Prior Publication Data

US 2012/0140367 A1 Jun. 7, 2012

Related U.S. Application Data

(63) Continuation of application No. PCT/EP2010/057152, filed on May 25, 2010.

(30) Foreign Application Priority Data

Jun. 12, 2009 (EP) ..................................... 09162631

(51) Int. Cl.
*H02H 3/00* (2006.01)

(52) U.S. Cl.
USPC .............................................. 361/71; 361/72

(58) Field of Classification Search
USPC .......................... 361/62–69, 72–75
See application file for complete search history.

(56) References Cited

U.S. PATENT DOCUMENTS

| | | | | |
|---|---|---|---|---|
| 2008/0224546 A1* | 9/2008 | TeSelle et al. | ................. | 307/125 |
| 2008/0225452 A1* | 9/2008 | Stoupis et al. | ................. | 361/62 |
| 2010/0161151 A1* | 6/2010 | Yang et al. | .................... | 700/297 |

FOREIGN PATENT DOCUMENTS

EP 1819022 A1 8/2007

OTHER PUBLICATIONS

International Search Report (PCT/ISA/210) issued on Oct. 4, 2010, by European Patent Office as the International Searching Authority for International Application No. PCT/EP2010/057152.
European Search Report issued on Oct. 28, 2001, for European Application No. 09162631.7.
Bogdan Kasztenny et al., IED 61850—A Practical Application Primer for Protection Engineers, Power Systems Conference, Mar. 1, 2006, pp. 18-50.
Dan Reckerd et al., Application of Peer-to-Peer Communication, for Protection and Control, at Seward Distribution Substation, Protective Relay Engineers, 2005 58th Annual Conference for Texas A&M Universidy, Texas, USA, Apr. 5-7, 2005, pp. 40-45.
Robert Brantley et al., The Application of IEC® 61850 to Replace Auxiliary Devices Including Lockout Relays, Distributed Feb. 3, 2009, pp. 1-25.
Notification of Transmittal of the International Preliminary Report on Patentability, International Preliminary Report on Patentability (IPRP) and Written Opinion of the International Searching Authority, issued by the International Bureau of WIPO in the corresponding International Application No. PCT/EP2010/057152.

* cited by examiner

*Primary Examiner* — Danny Nguyen
(74) *Attorney, Agent, or Firm* — Buchanan Ingersoll & Rooney PC

(57) ABSTRACT

Exemplary embodiments are directed to engineering of protection lockout functionality in a Substation Automation (SA) system. The system includes a breaker IED having protection-zone related intelligence in a lockout function block lockout function instances are assigned to respective protection zones, and are specified for each protection function which protection-zone(s) it shall trip and reset after lockout. Hence for switch yard configurations and power networks where a protection function trips multiple breakers by using several bay control or protection devices a more efficient implementation of lockout functionality is possible.

6 Claims, 1 Drawing Sheet

PROTECTION LOCKOUT IN SUBSTATION AUTOMATION

RELATED APPLICATION(S)

This application claims priority as a continuation application under 35 U.S.C. §120 to PCT/EP2010/057152, which was filed as an International Application on May 25, 2010 designating the U.S., and which claims priority to European Application 09162631.7 filed in Europe on Jun. 12, 2009. The entire contents of these applications are hereby incorporated by reference in their entireties.

FIELD

The disclosure relates to control systems, such as Process Control systems, in Substation Automation SA systems, with a standardized configuration representation.

BACKGROUND INFORMATION

Known substations in high and medium-voltage power networks can include primary devices such as electrical cables, lines, bus bars, disconnectors, circuit breakers, power transformers and instrument transformers, which are generally arranged in switch yards and/or bays. These primary devices can be operated in an automated manner via a Substation Automation (SA) system. The SA system can include secondary devices, among which Intelligent Electronic Devices (IED) responsible for protection, control and monitoring of the primary devices. The secondary devices can be hierarchically assigned to a station level or a bay level of the SA system. The station level can include a supervisory computer having an Operator Work Station (OWS) with a Human-Machine Interface (HMI) and running a station-level Supervisory Control And Data Acquisition (SCADA) software, as well as a gateway that communicates the state of the substation to a Network Control Centre (NCC) and receive commands from it. IEDs on the bay level, also termed bay units, in turn can be connected to each other as well as to the IEDs on the station level via an inter-bay or station bus primarily serving the purpose of exchanging commands and status information.

A communication standard for communication between the secondary devices of a substation has been introduced by the International Electrotechnical Committee (IEC) as part of the standard IEC 61850 entitled "communication networks and systems in substations". For non-time critical report messages, section IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet and/or RS-232C as physical media. For time-critical event-based messages, such as trip commands, IEC 61850-8-1 specifies the Generic Object Oriented Substation Events (GOOSE) directly on the Ethernet link layer of the communication stack. SA systems based on IEC61850 are configured by means of a standardized configuration representation or formal system description called Substation Configuration Description (SCD).

The protection lockout function is a protection related function which prohibits a re-close of tripped circuit breakers until an authorized person has explicitly removed the lockout, e.g. after having inspected the switch yard and the secondary equipment to verify that the cause of the preceding protection trip has been removed. The lockout function can be used for transformer protection trips, bus bar trips and breaker failure trips. The following functional specifications to be fulfilled include the following:

Distribution to multiple relays that control affected breakers.
Presentation of state to local and remote operators.
Standard operating procedure to clear the lockout.
Non volatile state—the lockout state can be stored in a way independent of power availability.
Independent handling of multiple lockouts of different protection functions on one and the same breaker.

This function can be solved by using bi-stable relays in the closing circuit of the circuit breakers, which are set by the protection trip and generally reset manually. For each protection function respective protection zone which may trip the circuit breaker a separate bi-stable relay can be provided at the breaker. However, for process bus based solutions, where the circuit breaker can be controlled by some electronics integrated into it, an electronic reset of the lockout function would be preferred over a bi-stable relay.

FIG. 1 schematically shows an electronic lockout relay in accordance with a known implementation; and The introduction of IEC 61850 with the GOOSE real time services offers the opportunity to replace the wiring to the circuit breakers by Ethernet based serial communication. The article (presented at Distributech 2009 Feb. 3) entitled "The Application of IEC 61850 to Replace Auxiliary Devices Including Lockout relays" by R. Brantley, K. Donahoe, J. Theron and E. Udren, and available at the time of filing from <<www.ge-energy.com/prod_serv/plants_td/en/downloads/gtr_aiecradlrp.pdf>>, proposes a communication bus based solution as illustrated in FIG. 1. The lockout function can be implemented in the breaker IEDs 13 for each breaker, and blocks the Circuit Breaker Close (CC) path. It can be triggered by the transformer (differential) protection function implemented in a transformer protection IED 11, and can be manually reset e.g. from a button or menu in the transformer protection IED 11. The trip command can be transferred via a serial bus 12. In addition to the lockout of the transformer protection function, the breaker controlled by IED 13 can also be tripped with lockout from a breaker failure function or a bus bar protection function, needing additional lockout relays (RS-Flipflops) and making the logic at the close circuit more complex. This kind of configuration implemented via a bus, e.g. based on IEC 61850 communication protocols, therefore needs complex engineering to "logically wire" the trip signals across the bus, couple the lockout relays to the breakers close circuit, and also to show the lockout state of the system to the operator.

A protection function protects some primary object, such as a line, a transformer, or a busbar. A fault on the object can be cleared by opening all circuit breakers surrounding this object and defining a so-called protection zone. Zones are electrically connected parts of the switchyard, which in general are limited by open disconnectors and open or closed circuit breakers. In case of a breaker failure protection being triggered by a failure of a particular circuit breaker, the trip is delegated to the circuit breakers of the protection zones connected to the left and right of the failed circuit breaker. Any closed circuit breaker is within two protection zones, one at its left side and one at its right side. The relation between circuit breakers and protection zones can be static as in ring configurations and 1½ breaker configurations, or is dynamically determined from the switchyard topology at single line level and by the current state of all disconnectors e.g., in case of double bus bar configurations.

Hence a circuit breaker needs at least two lockout relays, as long as redundant protection is not considered. As the breaker failure function will normally trip both zones right and left of a circuit breaker, a distinction between breaker failure protection and object related protection on behalf of an adjacent piece of primary equipment (transformer, line, bus bar) might specify another lockout relay instance. Lockout reset will have to be arranged for on each relay instance separately. In a known approach the trips from each zone should be physically or, with process bus, logically wired to all concerned breakers in a zone. For static configurations this might get complex if more than two breakers belong to a zone boundary. For dynamic zones this gets even more complex or nearly impossible.

EP 1819022 A1 aims at minimizing the potential damage caused by the failure of a single central Intelligent Electronic Device (IED) responsible for calculating, assigning and storing information about switchyard zones of a high or medium voltage switchyard including switchyard elements such as switches and connectivity nodes interconnected by lines. To this end, a distributed switchyard zone management is introduced, having a distributed storage of the knowledge about the switchyard zones with assignments of individual switchyard elements or components to the various switchyard zones being stored on several IEDs. The switchyard zones can be either protection zones or equipotential zones, wherein the first have a number of switchyard elements that are to be isolated simultaneously in case of a failure of a primary device. The boundary or circumference of a protection zone can be defined by circuit breakers and open disconnectors. Specific ways of distributed zone calculation and reset message passing are likewise disclosed.

SUMMARY

An exemplary method of protection lockout functionality in a Substation Automation SA system for a substation of a power system with a first protection zone delimited by first circuit breakers is disclosed. The method comprising: generating, for each of the first circuit breakers, a lockout function block configured by a zone ID indicative of the first protection zone; broadcasting, by a SA protection function, a trip message including the zone ID; and opening, upon reception of the trip message, the first circuit breakers and locking the first circuit breakers for re-close.

An exemplary Intelligent Electronic Device IED for controlling a circuit breaker in a substation of a power system is disclosed. The IED comprising: an input for receiving trip messages and lockout reset messages including a zone ID indicative of a protection-zone of the substation delimited by the circuit breaker; and a processor for executing the received messages.

BRIEF DESCRIPTION OF THE DRAWINGS

The subject matter of the disclosure will be explained in more detail in the following text with reference to exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
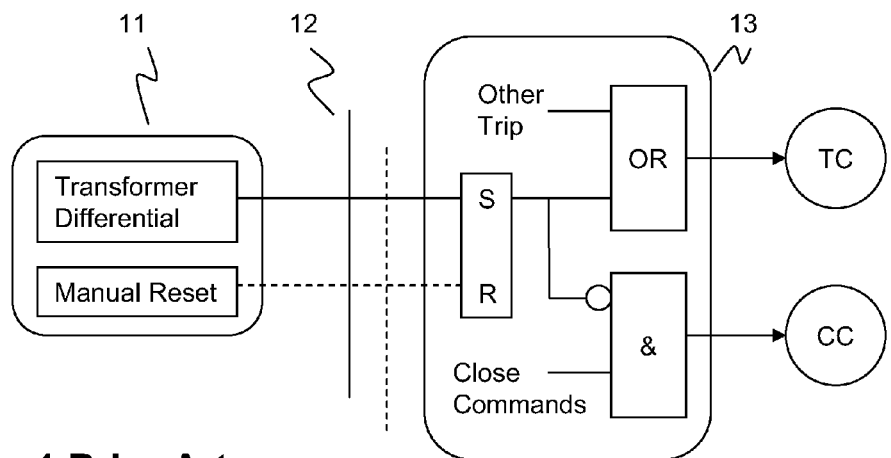
FIG. 1 schematically shows an electronic lockout relay in accordance with a known implementation.

Exemplary embodiments of the present disclosure can simplify the engineering as well as supervision and testing of a lockout functionality. This objective can be achieved by a method of implementing protection lockout functionality in a Substation Automation (SA) system, as well as by an Intelligent Electronic Device (IED).

According to an exemplary embodiment of the present disclosure wiring complexity as well as supervision related engineering can be removed, and protection zone related intelligence can be included into a lockout function block at the breaker IEDs instead. Hence, for switch yard configurations and power networks where a protection function trips multiple breakers by using several bay control or protection devices a more efficient implementation of lockout functionality is possible.

The remaining main configuration effort includes assigning lockout function instances to respective protection zones, and in specifying for each protection function which protection-zone(s) it shall trip and reset after lockout. Based thereupon, the lockout function can evaluate all trip messages with their zone identification to determine if the breaker shall be tripped and the lockout set, or if the lockout function of the breaker is to be reset. The engineering effort is again reduced in case of system modifications such as connecting additional bays to the bus bars, where the zone related identifications of the old respective unchanged parts can be retained.

A virtual lockout relay can be represented by a lockout function block, instance, or module, shortly called lockout function. Each circuit breaker can then be allocated two lockout functions for breaker failure protection, one to its right side and one to its left side, and optionally a further lockout function for object related protection on behalf of an adjacent piece of primary equipment (transformer, line, bus bar). Each zone can be uniquely identified by a zone ID or number, with each lockout function being aware of the zone to which it belongs. If an IED issues a protection trip to the communication system, it can be accompanied by the zone ID of the protection zone to be tripped. If a breaker failure trip is issued, it can be addressed to both zones to which the affected breaker is connected. This zone ID can then be read and recognized by the breaker control function allocated to the circuit breaker delimiting the respective protection zone. In addition, the lockout functions of the tripped circuit breakers are set, i.e. they block a re-close. The lockout state together with the zone ID can be communicated to a central place for an operator to get an overview about blocked zones as well as an easy means to remove the blockings. After clearance of the fault, with one single command including the zone ID (in case of breaker failure both concerned zone IDs) an appropriate zone lockout reset message can be broadcast. The latter causes all lockout functions in the zone to reset, and can be generated locally at the breaker IED, at the protection IEDs, or even from a station level HMI.

The static zone identification respective the base identifications for a dynamic zone calculation can be automatically determined from a formal description of the single line diagram e.g. as contained in an IEC 61850 SCD file. Each lockout function can be considered to be implemented as an IEC 61850 logical node instance, to be configured automatically by means of the appropriate zone identifier as well as the corresponding protection trip function, provided that these functions are allocated to the correct single line elements in the SCD file as defined in IEC 61850-6. Furthermore, and based on SCL compliant information describing the SA system, the data flow of GOOSE type trip and lockout reset messages can be automatically configured.

Figure 2:
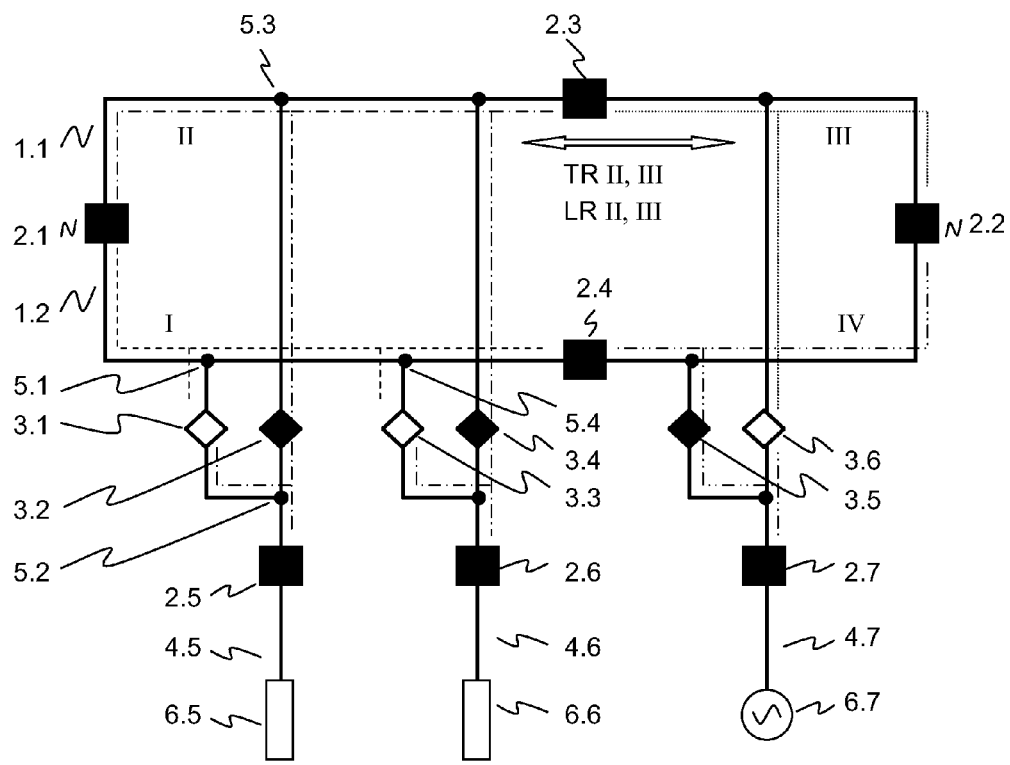
FIG. 2 shows a single line diagram of a switchyard with four protection zones in accordance with an exemplary embodiment of the present disclosure.

FIG. 2 shows a line diagram of a switchyard with four protection zones in accordance with an exemplary embodiment of the present disclosure. For example, FIG. 2 depicts an electrical single-line diagram of a switchyard with an exemplary double busbar topology. The diagram includes items or icons representative of various primary devices, such as bus bars 1, circuit breakers 2, disconnectors 3, line infeed or outgoing conductors 4, nodes 5, and loads or generators 6. Devices of the same kind can be distinguished via a continued decimal number, e.g., 5.1 and 5.2 which denote two distinct nodes. Generally, icons representative of open switches (disconnectors and breakers), are shown outlined, whereas switches that are in a closed state are represented as filled icons, for instance, a closed/open disconnector is depicted by a black/white rhomb. Obviously, other topologies are conceivable, with or without bypass busses, and the topologies can include other primary devices such as power transformers, generators, earthing isolators and instrument transformers without limiting the applicability of the exemplary embodiments. In the following, the distinction between the primary devices and their representation by icons or elements in the electrical line diagram on a drawing board, computer screen or other display is neglected. Likewise, message or telegram exchange between elements or primary devices can be understood as a communication between the respective IEDs of the SA system to which the elements are allocated and by which representations or instances of the primary device-objects are handled.

In detail, the topology depicted includes two coupling circuit breakers 2.1, 2.2 separating two bus bars 1.1, 1.2, which in turn are divided in two sections by section circuit breakers 2.3, 2.4. Three bays are depicted, each comprising a bay circuit breaker 2.5, 2.6, 2.7 connected via conductors 4.5, 4.6, 4.7 to distant loads 6.5, 6.6 or a generator 6.7. Each bay circuit breaker can be connectable to the two bus bars via two disconnectors 3.1, 3.2; 3.3, 3.4 and 3.5, 3.6. Protection zones can be electrically connected parts of the switchyard which are delimited by open disconnectors and open or closed circuit breakers. In an exemplary embodiment of the present disclosure, the states of the disconnectors as depicted in FIG. 2 give rise to four protection zones I, II, III, IV, which are indicated by broken lines of different patterns next to the sections of the bold-type single line diagram.

In the event of a breaker failure of circuit breaker 2.3, the circuit breakers 2.1, 2.5, 2.6 as well as 2.2, belonging to the two protection zones II and III adjacent to the failed circuit breaker, have to trip or open. Corresponding trip messages can be propagated over the substation communication network to the IEDs controlling the respective circuit breakers. As depicted by the block arrow in FIG. 2, the failed circuit breaker can send a telegram TR II III with the breaker failure trigger and the IDs of the concerned zones to all circuit breakers. The above enumerated circuit breakers that are on the border of the concerned zones (left or right of the circuit breaker) will then trip without any further centralized input or action due to the fact that they know by themselves to which protection zones they belong. When tripping, a breaker lockout function can be set until, following clearance of the fault on circuit breaker 2.3, a lockout reset message LR II III with the previous zone IDs is received.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Bus Bar
2 Circuit Breaker
3 Disconnector
4 Feeder or Outgoing Conductor
5 Node
6 Load
11 Protection IED
12 SA Communication Network
13 Breaker IED

What is claimed is:

1. A method of protection lockout functionality in a Substation Automation SA system for a substation of a power system with a first protection zone delimited by a plurality of circuit breakers, comprising:
    generating, for each of first circuit breakers in the plurality of circuit breakers, a lockout function block configured by a zone ID indicative of the first protection zone;
    broadcasting, by an SA protection function configured as a Breaker Failure (BF) protection of a second circuit breaker of the plurality of circuit breakers, a trip message including zone IDs of a first and second protection zone delimited by the second circuit breaker; and
    opening, upon reception of the trip message, the first circuit breakers and locking the first circuit breakers for reclose.

2. The method according to claim 1, comprising:
broadcasting, following a breaker failure clearance, a lockout reset message including two zone IDs.

3. The method according to claim 1, comprising:
updating, following a change in a dynamic topology of the substation, a protection-zone identification.

4. The method according to claim 1, comprising:
communicating a lockout state of all circuit breakers of the substation, together with protection-zone identification, to an operator for display.

5. An Intelligent Electronic Device IED for controlling a first circuit breaker in a substation of a power system having a plurality of second circuit breakers, comprising:
    an input for receiving trip messages and lockout reset messages from a Breaker Failure (BF) protection of at least one of the second circuit breakers, the messages including zone IDs of a first and second protection zone delimited by at least one of the second circuit breakers; and
    a processor for executing the received messages.

6. The IED according to claim 5, adapted to receive and execute trip as well as lockout reset messages from different SA protection functions and including the same zone ID.

* * * * *